US006630893B2

(12) United States Patent
Schuette

(10) Patent No.: US 6,630,893 B2
(45) Date of Patent: Oct. 7, 2003

(54) DIGITAL CAMERA VALET GATE

(75) Inventor: Kai H. Schuette, Detroit, MI (US)

(73) Assignee: CVPS, Inc., Detroit, MI (US)

( * ) Notice: Subject to any disclaimer, the term of this patent is extended or adjusted under 35 U.S.C. 154(b) by 72 days.

(21) Appl. No.: 09/822,260

(22) Filed: Apr. 2, 2001

(65) Prior Publication Data

US 2002/0140811 A1 Oct. 3, 2002

(51) Int. Cl.[7] .................................................. B60Q 1/48
(52) U.S. Cl. .................... 340/932.2; 340/933; 340/937; 340/5.7; 340/5.71; 340/5.2
(58) Field of Search ............................. 340/932.2, 933, 340/937, 5.7, 5.71, 5.2

(56) References Cited

U.S. PATENT DOCUMENTS 4,592,157 A * 6/1986 Kerr ............................ 40/634
4,962,955 A * 10/1990 Ferrara et al. .............. 292/216
4,990,757 A * 2/1991 Edwards et al. ............ 235/384
5,339,000 A 8/1994 Bashan et al. ........... 340/932.2
5,373,282 A 12/1994 Carter ........................ 340/539
5,550,551 A * 8/1996 Alesio ........................ 342/457
5,710,557 A * 1/1998 Schuette .................. 340/932.2
5,909,918 A * 6/1999 Kowalewski et al. ....... 292/199
5,959,540 A * 9/1999 Walter ....................... 340/5.64
6,097,106 A * 8/2000 Roddy et al. .............. 307/10.5
6,204,754 B1 * 3/2001 Berstis ....................... 340/435
6,275,141 B1 * 8/2001 Walter ....................... 340/5.64

* cited by examiner

*Primary Examiner*—Daryl Pope
(74) *Attorney, Agent, or Firm*—Harness, Dickey & Pierce, P.L.C.

(57) ABSTRACT

A system and method for managing a valet parking system enables the tracking of the damage to vehicles. The method provides for linking digital images of a vehicle to a set of valet parking data. The valet parking data is collected from a valet attendant, and the digital images are collected from a plurality of digital cameras. The images document a physical condition of the vehicle when the vehicle is operated by the valet attendant. The method further provides for storing the valet parking data and the digital images to an electronic database. Thus, digital images can be retrieved from the electronic database based on the valet parking data, and damage can be assessed.

34 Claims, 9 Drawing Sheets

66

68

90

| Ticket # | Who Parked It? | Pre-Image 1 | Pre-Image 2 | Pre-Image 3 | Pre-Image 4 | Who Pulled It? | Post-Image 1 |
|---|---|---|---|---|---|---|---|
| 321 | John F. | | | | | Sue B. | |

FIG. 9

DIGITAL CAMERA VALET GATE

BACKGROUND OF THE INVENTION

1. Technical Field

The present invention generally relates to valet parking systems. More particularly, the invention relates to a system and method for managing valet parking systems that improves the efficiency of valet parking processes.

2. Discussion

Valet parking has long been popular at various establishments such as restaurants, hotels and nightclubs. Under conventional valet parking schemes, a valet parking attendant gives a ticket stub (corresponding to a valet ticket), to an owner/driver of a vehicle when the driver arrives at the establishment. In return, the driver transfers keys and possession of the vehicle over to the parking attendant, and enters the establishment. The attendant then parks the vehicle in a parking area in an identifiable location. When the driver leaves the establishment and requests the return of the vehicle, the attendant (which may or may not be the attendant that parked the vehicle) retrieves the vehicle from the parking area based on the information provided by the ticket stub. The retrieving attendant then transfers the keys (and possession of the vehicle) back to the driver upon returning to the valet staging area.

While a few technologies have been developed to make the above process more efficient, certain difficulties remain. For example, it has been experienced that the driver may claim or allege damage to the vehicle during the time period in which possession was transferred to the parking attendant/valet service. Conventional valet parking services, however, provide manual or no mechanism (aside from the word of the valet attendant) for determining the validity of such claims. It is therefore easy to understand that valet service providers are placed in a compromised position when an attendant either denies damaging a vehicle or alleges that the damage was pre-existing. Without conclusive evidence, valet service providers typically must bear the costs of all alleged damage and/or pay higher insurance premiums. It is therefore desirable to provide a mechanism for isolating the time period during which damage occurs to a vehicle with regard to a valet parking process.

Another concern relates to the accountability of valet parking attendants. For example, valet parking attendants have often been characterized as being reckless with vehicles due to the lack of monitoring common to most valet parking systems. It is also believed that this recklessness is partially a function of the fact that conventional systems fail to adequately track damage as discussed above. This is particularly true considering the fact that the attendant parking the vehicle may or may not be the attendant retrieving the vehicle in any given circumstance. It is therefore desirable to provide a computerized valet parking system that enables the linking vehicle damage to valet parking attendants.

The above and other objectives are provided by a method for managing a computerized valet parking system in accordance with the principles of the present invention. The method provides for linking pre-parking digital images of the vehicle to a first set of valet parking data in an electronic database. The pre-parking digital images document a physical condition of the vehicle when the vehicle is parked by a first valet attendant. The method further provides for retrieving the pre-parking digital images from the electronic database based on the first set of valet parking data. In one embodiment, post-parking digital images and a second set of valet parking data are linked to the pre-parking digital images and the first set of valet parking data. Thus, it can readily be determined whether damage occurred to the vehicle before the first valet attendant parked the vehicle based on the pre-parking digital images and whether damage occurred after a second valet attendant retrieved the vehicle based on the post-parking digital images.

Further in accordance with the present invention, a method for linking digital images of a vehicle to a set of valet parking data is provided. The method provides for collecting the valet parking data from a valet parking attendant, and collecting the digital images from a plurality of digital cameras. The images document a physical condition of the vehicle when the vehicle is parked by the valet attendant. The method further provides for storing the valet parking data and the digital images to an electronic database.

In another aspect of the invention, a computerized valet parking system includes a first kiosk, a first digital camera array and a network server. The first kiosk collects a first set of valet parking data from a first valet attendant. The first digital camera array collects pre-parking digital images of a vehicle at an entrance location of a parking area. The network server links the pre-parking digital images to the first set of valet parking data. In a preferred embodiment, the parking system further includes a second kiosk and a second digital camera array. The second kiosk collects a second set of valet parking data from a second valet attendant. The second digital camera array collects post-parking digital images of the vehicle at an exit location of the parking area. Thus, the network server further links the post-parking images and the second set of valet parking data to the pre-parking images and the first set of valet parking data.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute part of this specification. The drawings illustrate various features and embodiments of the invention, and together with the description serve to explain the principles and operation of the invention.

BRIEF DESCRIPTION OF THE DRAWINGS

The various advantages of the present invention will become apparent to one skilled in the art by reading the following specification and sub-joined claims and by referencing the following drawings, in which:

FIG. 9 illustrates a valet database in accordance with the principles of the present invention.

DETAILED DESCRIPTION OF THE PREFERRED EMBODIMENTS

The following description of the preferred embodiment(s) is merely exemplary in nature and is in no way intended to limit the invention, its application, or uses.

Figure 1:
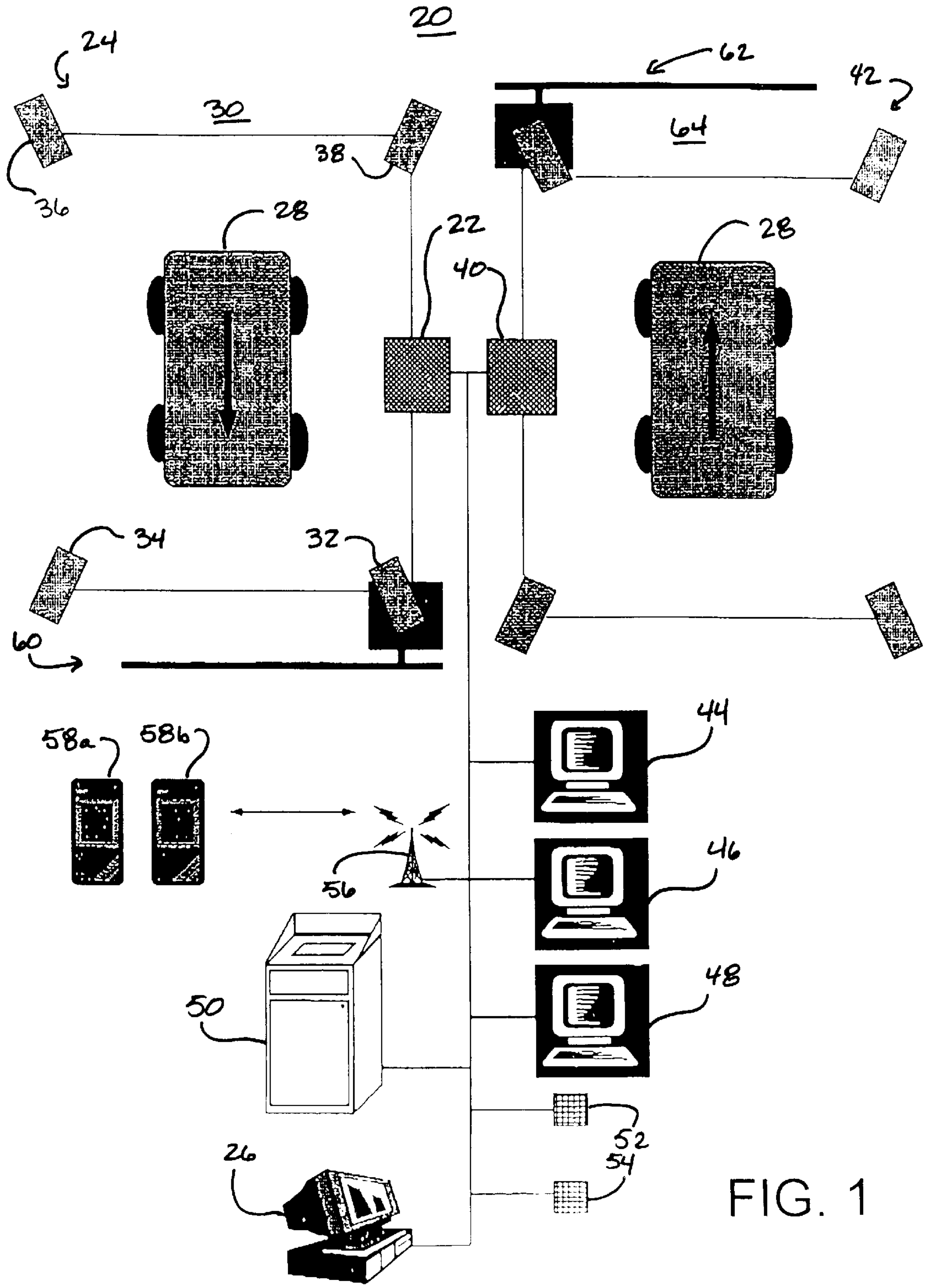
FIG. 1 is a diagram of a computerized valet parking system in accordance with the principles of the present invention.

Turning now to FIG. 1, the preferred computerized valet parking system is shown generally at 20. The parking system 20 has a wide range of applicability and can be used in virtually any environment in which valet parking is desired. Thus, casinos, hospitals, airports, restaurants, hotels, malls, night clubs and high volume/mixed use entertainment complexes can all benefit from the unique features of present invention.

Generally, it can be seen that the parking system 20 has a first kiosk 22, a first digital camera array 24 and a network server 26. The first kiosk 22 collects a first set of valet parking data from a first valet attendant typically located inside the vehicle 28. The first digital camera array 24 collects pre-parking digital images of the vehicle 28 at an entrance location 30 of a parking area. The network server 26 links the pre-parking digital images to the first set of valet parking data and therefore enables a tracking of the physical condition of the vehicle 28.

Specifically, it is preferred that the first digital camera array 24 has a first pre-parking camera 32 focused on a front left region of the vehicle 28 for generating a first pre-parking digital image. A second pre-parking camera 34 is focused on a front right region of the vehicle for generating a second pre-parking digital image. The array 24 further includes a third pre-parking camera 36 focused on a rear right region of the vehicle 28 for generating a third pre-parking digital image. It is further preferred that a fourth pre-parking camera 38 is focused on a rear left region of the vehicle 28 for generating a fourth pre-parking digital image. It will be appreciated that by structuring the array 24 such that the images provide a complete documentation of the physical condition of the vehicle 28, damage can be isolated to either the period before parking the vehicle 28 or after parking the vehicle 28.

It is important to note that the above-described arrangement of the first digital camera array 24 is only one approach to imaging the vehicle 28. In fact, the number of cameras as well as their positioning relative to the vehicle 28 can all vary depending upon the circumstances. For example, the cameras may be focused on the four sides of the vehicle 28 as opposed to the corners of the vehicle 28 as illustrated. The same is true for the second digital camera array 42 discussed below.

It should also be pointed out that the use of digital images (or "snapshots") provides a number of benefits over traditional video film capture. For example, the storage requirements associated with video film make searching the film for a particular instant in time quite difficult and cumbersome. Furthermore, images of moving objects generally do not provide the same picture quality as still photos.

In one embodiment, the parking system 20 further includes a second kiosk 40 and a second digital camera array 42 for controlling vehicle departures from the parking area. The second kiosk 40 collects a second set of valet parking data from a second valet attendant (or the first valet attendant, depending upon the circumstances) and the second digital camera array 42 collects post-parking digital images of the vehicle 28 at an exit location 64 of the parking area. Thus, the network server 26 can further link the post-parking images and the second set of valet parking data to the pre-parking images and the first set of valet parking data. It will be appreciated that this feature provides an additional verification mechanism and enables enhanced "resolution" to the damage pinpointing process. Thus, the valet parking process can be divided into a "pre-garage" time period, a "garage" time period, and a "post-garage" time period. Pre-garage damage has occurred if the pre-parking images indicate the presence of damage, whereas post-garage damage has occurred if the post-parking images indicate the absence of damage (provided damage has occurred at all). By proving that damage occurred during the pre- and post-garage time periods, valet parking services can potentially avoid liability. This ability may also lead to lower insurance premiums. Furthermore, the accountability of both the first valet attendant and the second valet attendant is significantly increased by capturing digital images at the entrance location 39 and the exit location 64.

It should further be noted that the network server 26 provides connectivity and access to a number of optional devices. For example, a manager's terminal 44, a cashier/dispatcher terminal 46, and a parking area office terminal 48 can all access the digital images in the event that a claim is made. In fact, it is envisioned that the digital images can be periodically checked as part as an auditing procedure. Other devices include a valet dispatch 50, a hotel front desk request unit 52, a restaurant hostess desk request unit 54 and a radio frequency (RF) receiver 56 for maintaining an RF interface to hand held units 58 carried by valet parking attendants.

The parking system 20 may also include an entrance security system 60 (such as a gate) disposed at the entrance location 30, where the entrance security system 60 enables entry of the vehicle 28 into the parking area upon verification of the first set of valet parking data. Furthermore, the preferred parking system 20 has an exit security system 62 disposed at the exit location 64, where the exit security system 62 enables exit of the vehicle 28 from the parking area upon verification of the second set of valet parking data. This arrangement is particularly useful in situations where the parking area is a parking garage with restricted access.

Figure 7:
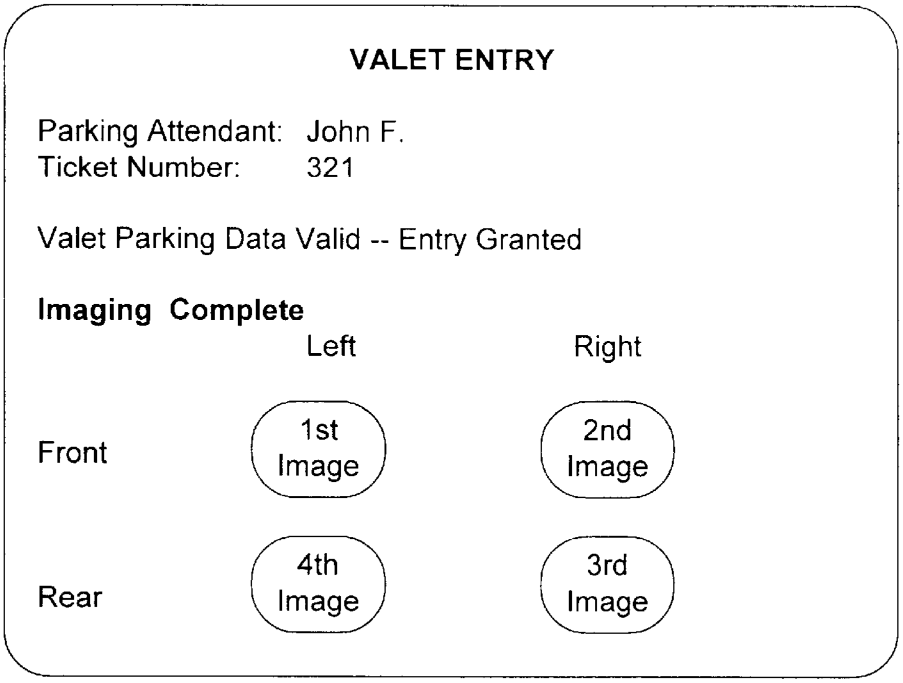
FIG. 7 illustrates a screen appearing on the first kiosk shown in FIG. 1.
Figure 8:
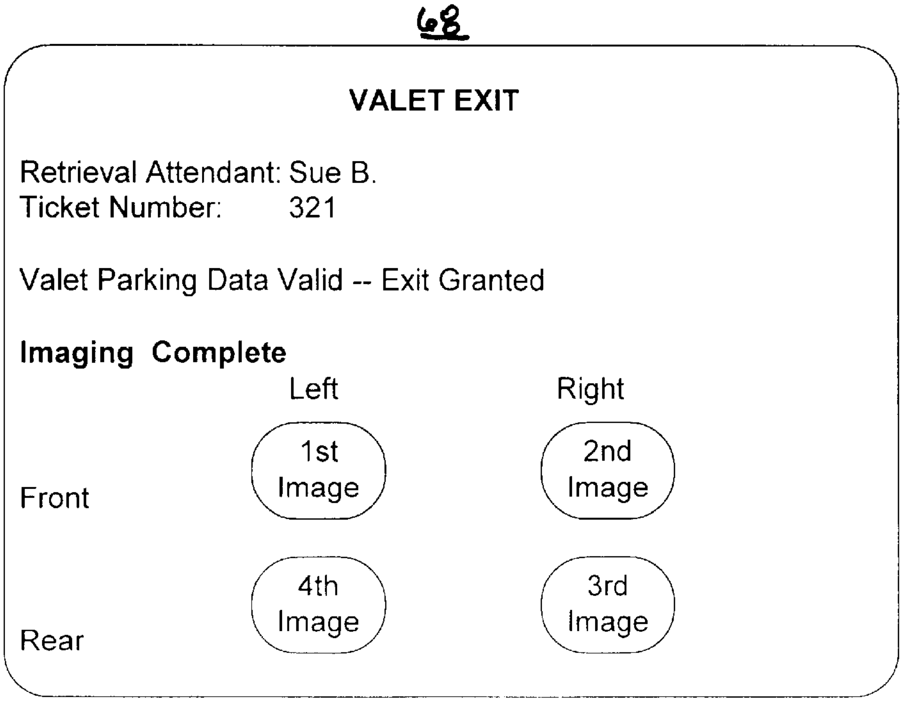
FIG. 8 illustrates a screen appearing on the second kiosk shown in FIG. 1.

With continuing reference to FIGS. 1 and 7, the first kiosk 22 will be described in greater detail. It can be seen that an entry screen 66 identifies the parking attendant, ticket number and messages regarding validation and imaging. FIG. 8 illustrates an exit screen 68 displayed on the second kiosk 40 (FIG. 1). It can be seen that while the particular vehicle 28 has a unique ticket number (namely, number 321), the retrieval attendant may be a different individual than the parking attendant. The digital images can be captured and collected using any number of well known imaging techniques.

Figure 2:
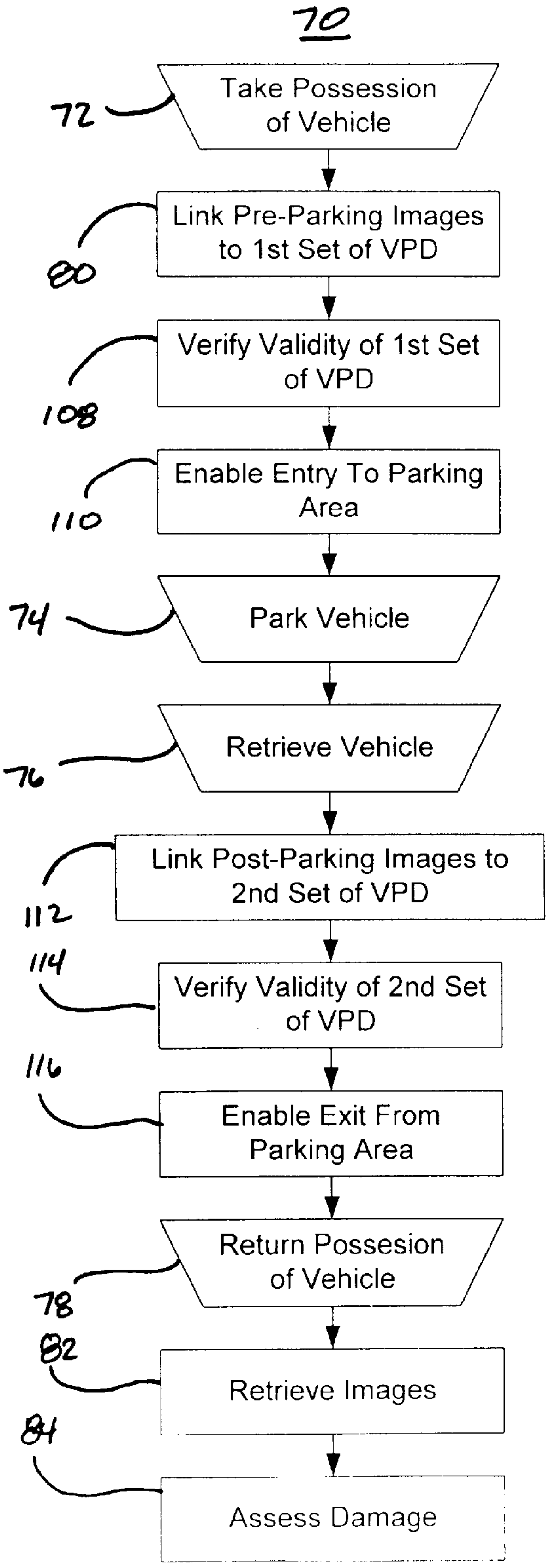
FIG. 2 is a flowchart of a method for managing a valet parking system in accordance with the principles of the present invention.

Turning now to FIG. 2, the preferred approach to managing a computerized valet parking system is shown at 70.

Generally, it can be seen that in accordance with conventional valet parking processes, the first valet attendant takes possession of the vehicle at step 72 and parks the vehicle at step 74. When the owner/driver requests (either via computer or manually) return of the vehicle, the valet attendant retrieves the vehicle at step 76 and returns possession of the vehicle to the driver at step 78.

In the event that a question is raised as to damage to the vehicle, the present invention provides a number of unique steps to quickly resolve the situation. For example, it can be seen that at step 80 pre-parking digital images of the vehicle are linked to a first set of valet parking data (VPD) in an electronic database. As already discussed, the pre-parking digital images document a physical condition of the vehicle when the vehicle is parked by the first valet attendant. At step 82, the pre-parking digital images are retrieved from the electronic database based on the first set of valet parking data. Thus, at step 84 it can be determined whether damage occurred to the vehicle before the first valet attendant parked the vehicle based on the pre-parking digital images.

Figure 3:
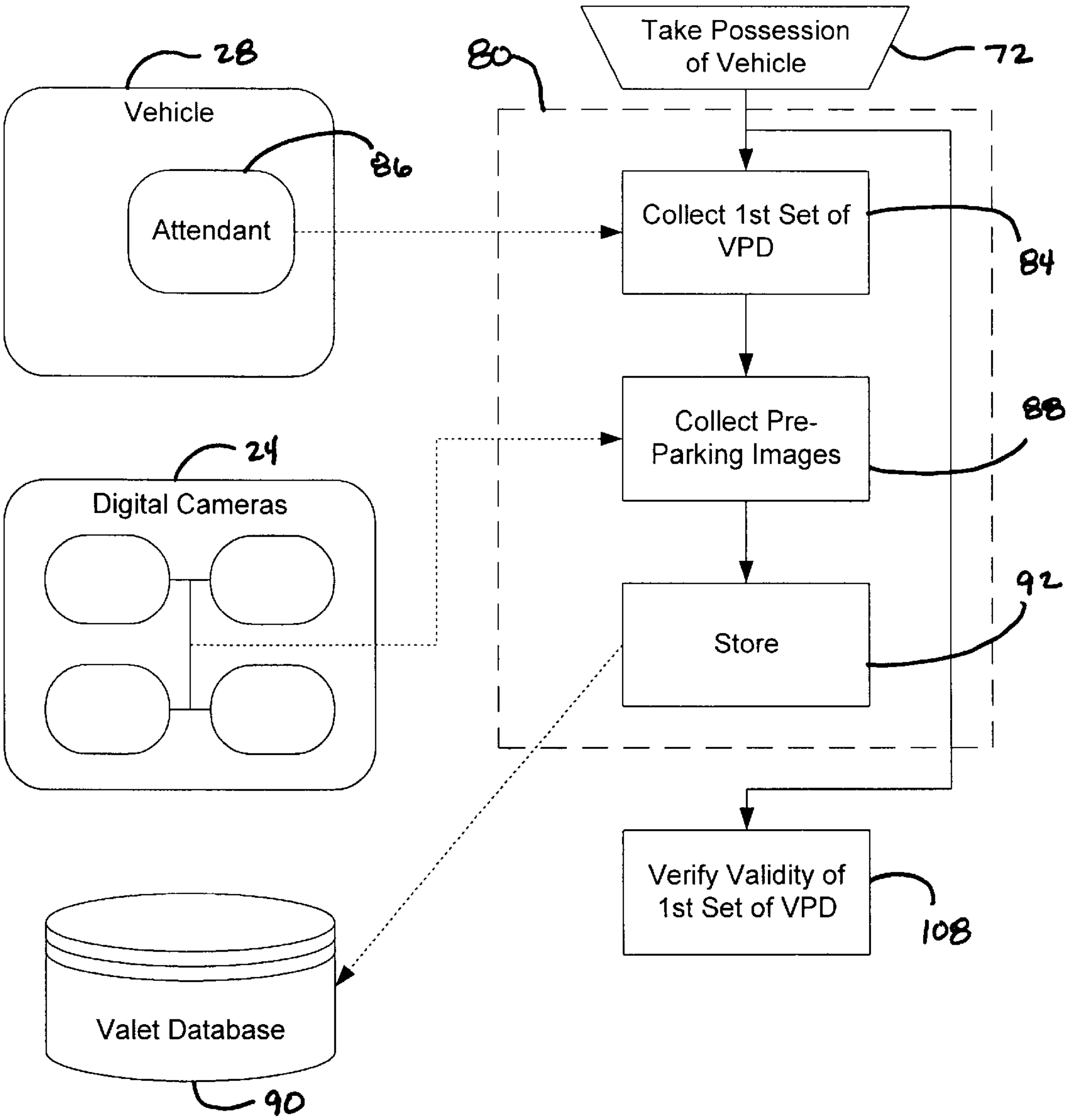
FIG. 3 is a flowchart of a process for linking pre-parking digital images of a vehicle to a first set of valet parking data in accordance with the principles of the present invention.

FIG. 3 shows the preferred approach to linking the pre-parking digital images at step 80. Specifically, it can be seen that at step 84 the first set of valet parking data is collected from the first valet attendant 86. At step 88 the pre-parking digital images are collected from the first digital camera array 24. The first set of valet parking data and the pre-parking digital images are stored to an electronic valet database 90 at step 92.

Figure 4:
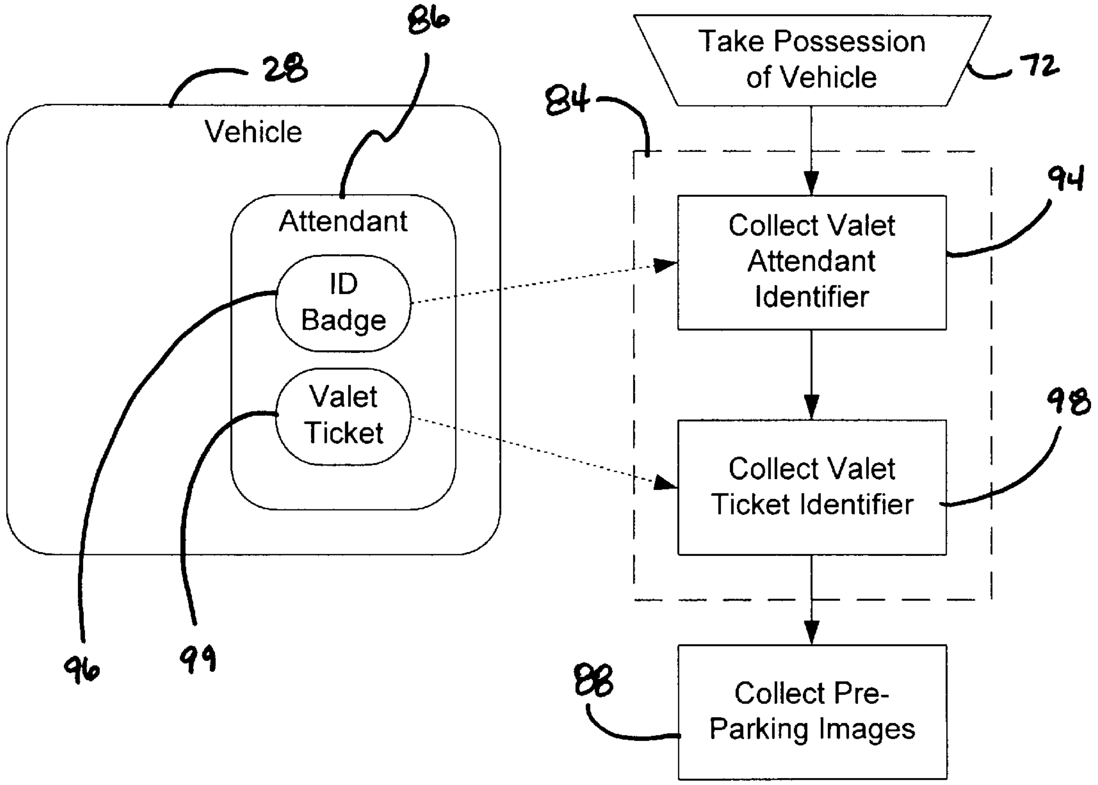
FIG. 4 is a flowchart of a process for collecting a first set of valet parking data in accordance with the principles of the present invention.

Turning now to FIG. 4, the preferred approach to collecting the first set of VPD is shown at step 84. It is preferred that a valet attendant identifier is collected at step 94 by scanning electronic indicia printed on an employee badge 96 of the first valet attendant 86, where the electronic indicia (such as barcode information) associates the first valet attendant with a unique identifier. While bar coding the employee badge 96 is the preferred approach, other approaches such as providing the employee badge 96 with a low power RF transmitter to enable automatic retrieval of the attendant identifier can be used. At step 98 a valet ticket identifier is collected by scanning electronic indicia (such as barcode information) printed on a valet ticket 99, where the electronic indicia associates the valet ticket 99 with a unique identifier. Optionally, the valet parking ticket can be encoded with other electronic indicia such as a programmable magnetic stripe.

Figure 5:
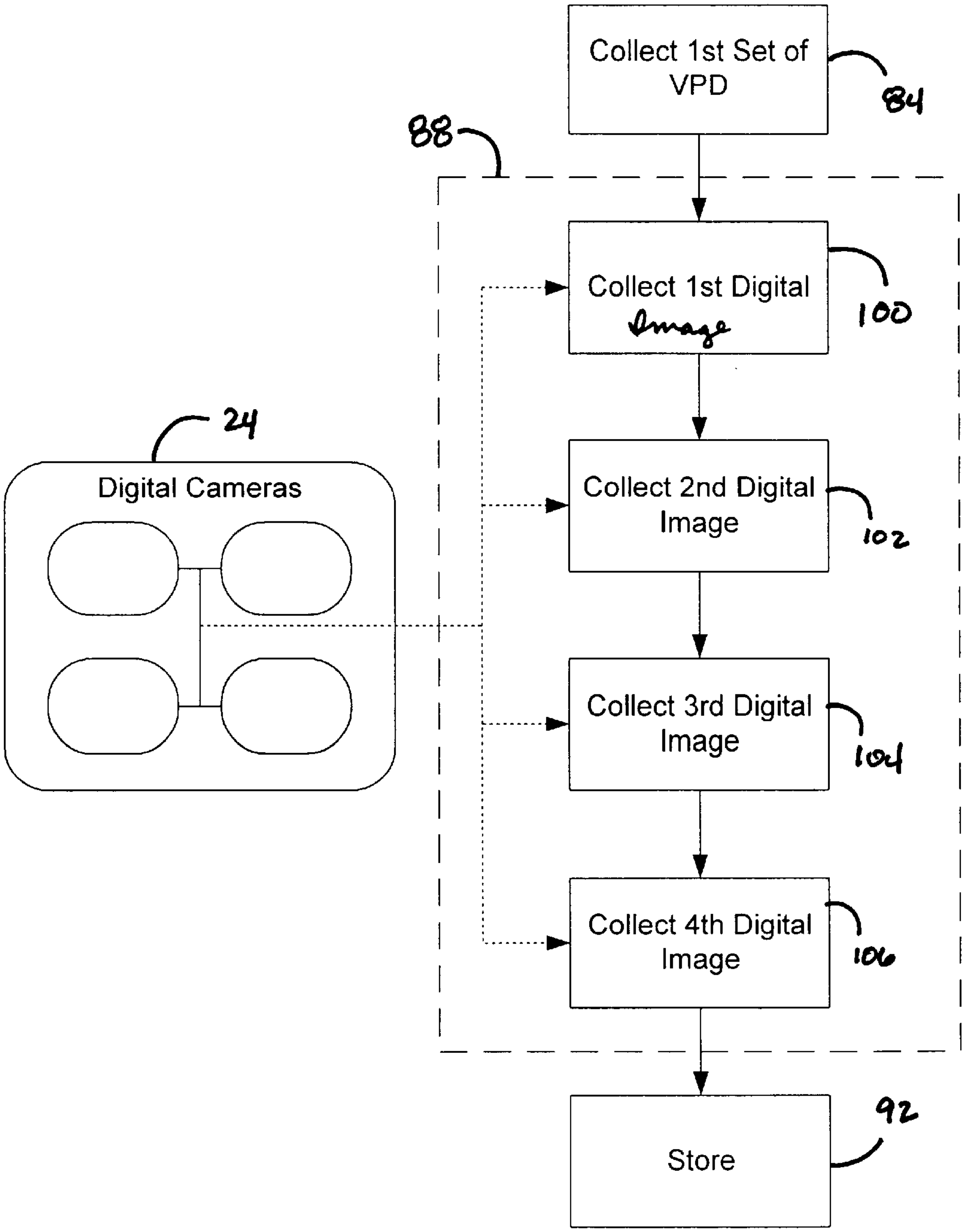
FIG. 5 is a flowchart of a process for collecting digital images from a plurality of digital cameras in accordance with the principles of the present invention.

Turning now to FIG. 5, the preferred approach to collecting pre-parking images is shown in greater detail at step 88. Specifically, it can be seen that a first pre-parking digital image of a front left region of the vehicle is collected at step 100. At steps 102 and 104 a second pre-parking digital image and a third pre-parking digital image are collected of a front right region of the vehicle and a rear right region of a vehicle, respectively. It can further be seen that at step 106 a fourth pre-parking digital image of a rear left region of the vehicle is collected. As already discussed, using multiple images enables a full documentation of the physical condition of the vehicle and using digital images significantly enhances the ability to link the images to other information.

Returning now to FIG. 2, is can be seen that it is preferred that the method 70 includes the step 108 of verifying the validity of the first set of VPD. Entry of the vehicle into the parking area can be enabled at step 110 upon verification of the validity of the first set of VPD. As already discussed, step 108 can include the verification of both a valet attendant identifier and a valet ticket identifier.

It will further be appreciated that step 112 provides for linking of post-parking digital images of the vehicle to a second set of VPD in the electronic database. The post-parking digital images document a physical condition of the vehicle when the vehicle is retrieved. Retrieval can be accomplished by either the first valet attendant or a second valet attendant. Furthermore, step 114 provides for verifying the validity of the second set of VPD, and enabling exit of the vehicle out of the parking area at step 116 upon verification of the validity of the second set of VPD. Thus, any of the images can be retrieved at step 82 from the valet database based on any of the VPD.

Figure 6:
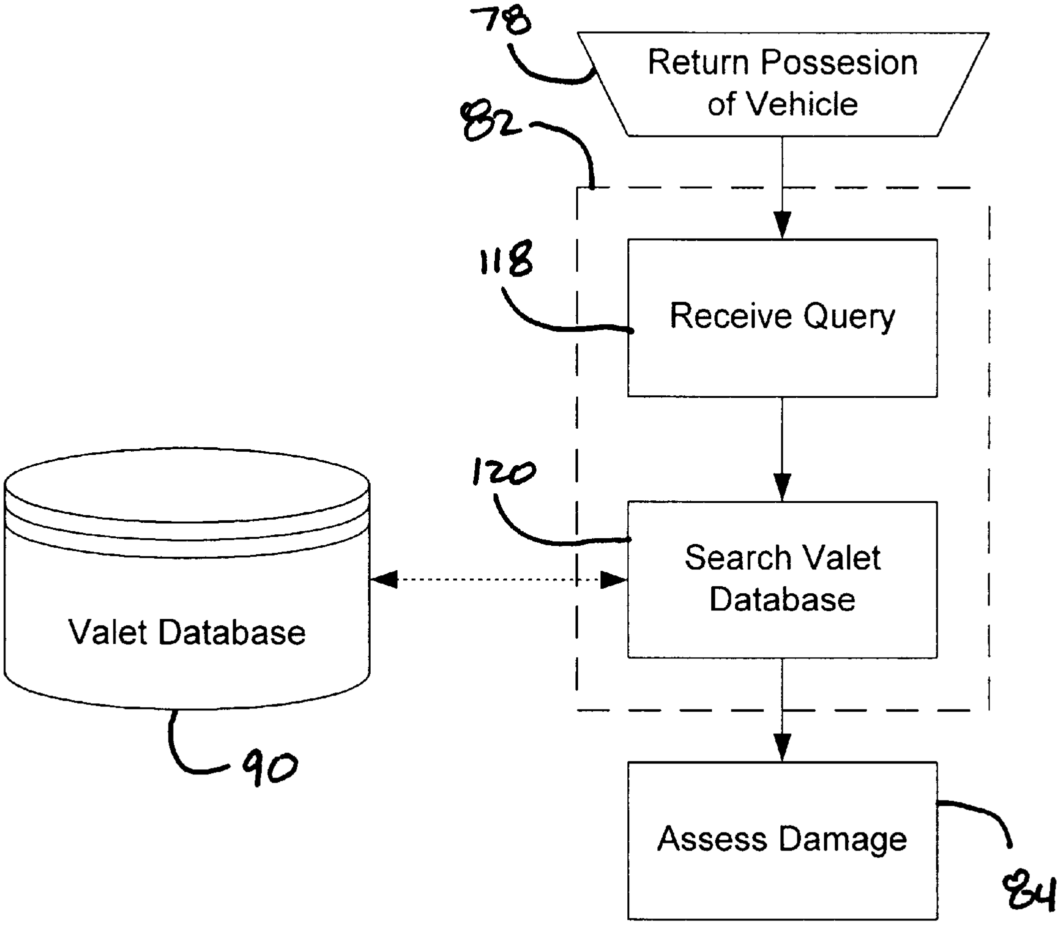
FIG. 6 is a flowchart of a process for retrieving digital images from an electronic database based on valet parking data in accordance with the principles of the present invention.

FIG. 6 shows the preferred approach to retrieving images from the valet database 90 in greater detail at step 82. Specifically, it can be seen that at step 118 a database query is received, where the database query includes either the first set of VPD, the second set of VPD, or any portion thereof. In accordance with the query, the electronic valet database 90 is searched at step 120 for the VPD included in the query.

FIG. 9 shows an example of a valet database 90 in accordance with the present invention. It will be appreciated that certain fields can be defined as being searchable, and thus can be included in the database query. For example, if it desirable to retrieve all images associated with ticket number 321, the ticket number can be treated as the VPD used to conduct the search. It should be noted that other fields can be defined as searchable fields and that the present invention is not limited to any particular database implementation. For example, other data such as the make and model, license plate number, vehicle color, and owner/driver name can all be included in the database 90. Furthermore, the image entries can include expandable thumbnails or can include hyperlinks to appropriate locations containing the actual images.

Figure 10:
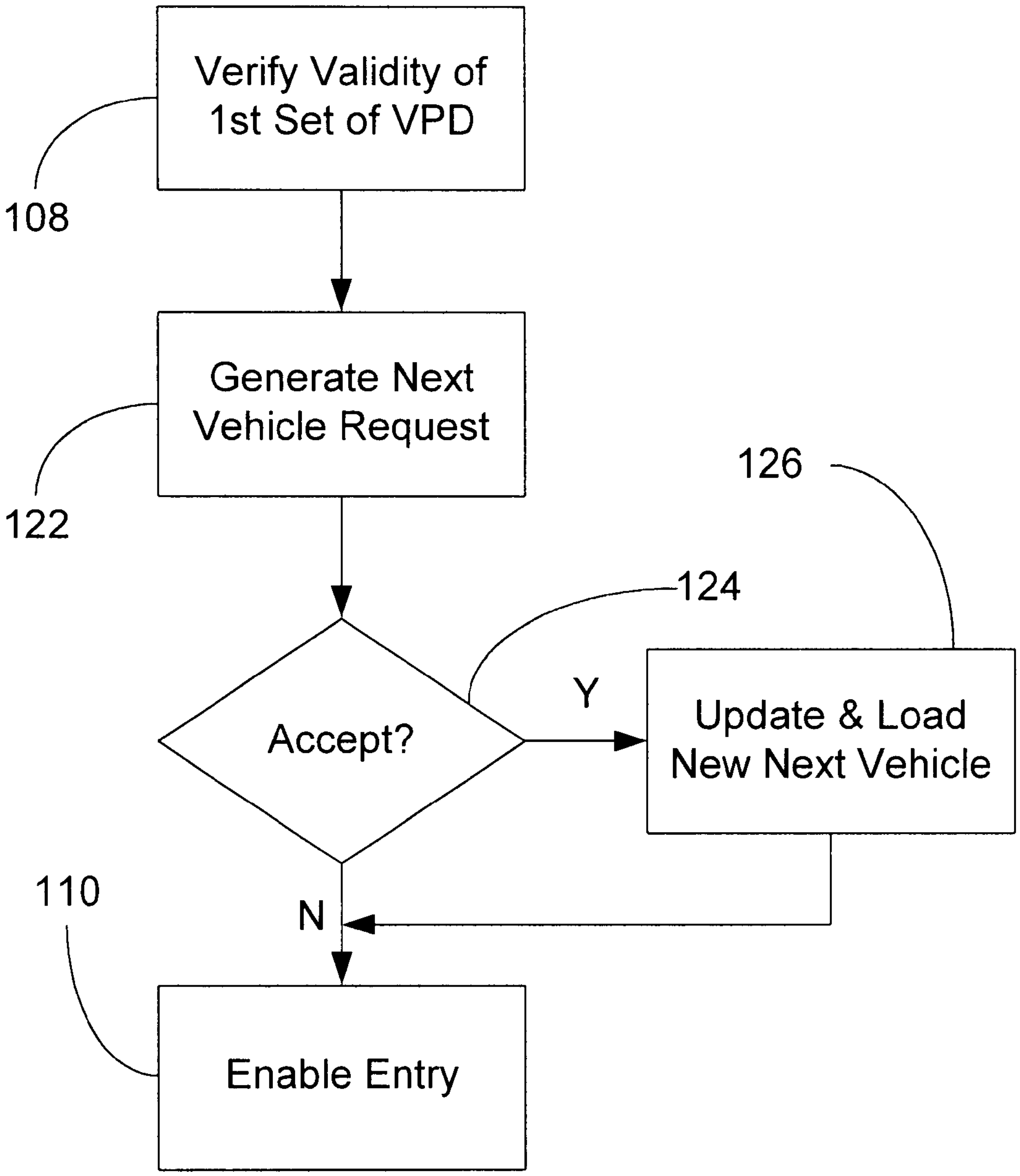
FIG. 10 is a flowchart of a process for generating next vehicle retrieval requests in accordance with the principles of the present invention.

FIG. 10 illustrates that the present invention can further provide for generating next vehicle retrieval requests at step 122 (at the first kiosk) in order to alert the attendant of the next vehicle to be retrieved. As a result, either an acceptance or a denial of the request can be received at step 124 from the valet attendant. If the request is accepted, step 126 provides for loading a new next vehicle into memory to be used for the next request. It will be appreciated that such a feature is particularly useful once the parking area has reached capacity, because the system can control a "one-out-one-in" process. Furthermore, the next vehicle request provides the attendant with an efficient system to park and retrieve vehicles—thereby reducing costs. It should be noted that such a system is most appropriate for schemes in where keys are left with the cars by the valet attendants.

It should also be noted that license plate recognition is also an available feature. Under such an approach, one of the digital cameras captures the license plate and uses well known and commercially available software to decipher the content contained on the license plate. The alphanumeric interpretation may then be imported into the vehicle license plate field automatically.

Those skilled in the art can now appreciate from the foregoing description that the broad teachings of the present invention can be implemented in a variety of forms. Therefore, while this invention can be described in connection with particular examples thereof, the true scope of the invention should not be so limited since other modifications will become apparent to the skilled practitioner upon a study of the drawings, specification and following claims.

What is claimed:

1. A computerized valet parking system comprising:

a first kiosk for collecting a first set of valet parking data from a first valet attendant;

a first pre-parking camera focused on a front left region of a vehicle for generating a first pre-parking digital image;

a second pre-parking camera focused on a front right region of the vehicle for generating a second pre-parking digital image;

a third pre-parking camera focused on a rear right region of the vehicle for generating a third pre-parking digital image;

a fourth pre-parking camera focused on a rear left region of the vehicle for generating a fourth pre-parking digital image;

a second kiosk for collecting a second set of valet parking data from a second valet attendant;

a first post-parking camera focused on a front left region of the vehicle for generating a first post-parking digital image;

a second post-parking camera focused on a front right region of the vehicle for generating a second post-parking digital image;

a third post-parking camera focused on a rear right region of the vehicle for generating a third post-parking digital image;

a fourth post-parking camera focused on a rear left region of the vehicle for generating a fourth post-parking digital image; and a network server for linking the digital images and the valet parking data together.

2. The parking system of claim 1 further including:

an entrance system disposed at the entrance location, the entrance system enabling entry of the vehicle into the parking area upon verification of the first set of valet parking data; and an exit system disposed at the exit location, the exit system enabling exit of the vehicle from the parking area upon verification of the second set of valet parking data.

3. A method for managing a computerized valet parking system, the method comprising the steps of:

linking pre-parking digital images of a vehicle to a first set of valet parking data in an electronic database, the pre-parking digital images documenting a physical condition of the vehicle when the vehicle is parked by a first valet attendant;

retrieving the pre-parking digital images from the electronic database based on the first set of valet parking data; and determining whether damage occurred to the vehicle before the first valet attendant parked the vehicle based on the pre-parking digital images.

4. The method of claim 3 further including the steps of:

collecting the first set of valet parking data from the first valet attendant;

collecting the pre-parking digital images from a plurality of digital cameras; and storing the first set of valet parking data and the pre-parking digital images to the electronic database.

5. The method of claim 4 further including the step of collecting a valet attendant identifier from the first valet attendant.

6. The method of claim 5 further including the step of reading electronic indicia encoded on an employee badge of the first valet attendant, the electronic indicia associating the first valet attendant with a unique identifier.

7. The method of claim 4 further including the step of collecting a valet ticket identifier from the first valet attendant.

8. The method of claim 7 further including the step of scanning electronic indicia printed on a valet ticket, the electronic indicia associating the valet ticket with a unique identifier.

9. The method of claim 4 further including the step of:

collecting a first pre-parking digital image of a front left region of the vehicle;

collecting a second pre-parking digital image of a front right region of the vehicle;

collecting a third pre-parking digital image of a rear right region of the vehicle; and collecting a fourth pre-parking digital image of a rear left region of the vehicle.

10. The method of claim 3 further including the steps of:

verifying a validity of the first set of valet parking data; and enabling entry of the vehicle into a parking area upon verification of the validity of the first set of valet parking data.

11. The method of claim 10 further including the step of verifying a validity of a valet attendant identifier.

12. The method of claim 10 further including the step of verifying a validity of a valet ticket identifier.

13. The method of claim 3 further including the steps of:

receiving a database query, the database query including the first set of valet parking data; and searching the electronic database for the first set of valet parking data in accordance with the database query.

14. The method of claim 13 further including the step of searching the electronic database for a first valet attendant identifier.

15. The method of claim 13 further including the step of searching the electronic database for a valet ticket identifier.

16. The method of claim 3 further including the step of locating vehicle damage in the pre-parking digital images.

17. The method of claim 3 further including the steps of:

linking post-parking digital images of the vehicle to a second set of valet parking data in an electronic database, the post-parking digital images documenting a physical condition of the vehicle when the vehicle is retrieved by a second valet attendant;

retrieving the post-parking digital images from the electronic database based on the second set of valet parking data; and determining whether damage occurred to the vehicle after the second valet retrieved the vehicle based on the post-parking digital images.

18. A method for linking digital images of a vehicle to a set of valet parking data, the method comprising the steps of:

collecting the valet parking data from a valet attendant;

collecting the digital images from a plurality of digital cameras, the images documenting a physical condition of the vehicle when the vehicle is operated by the valet attendant; and storing the valet parking data and the digital images to an electronic database.

19. The method of claim 18 further including the step of collecting a valet attendant identifier from the valet attendant.

20. The method of claim 19 further including the step of reading electronic indicia encoded on an employee badge of the valet attendant, the electronic indicia associating the valet attendant with a unique identifier.

21. The method of claim 19 further including the step of receiving a radio frequency (RF) signal from an employee badge of the valet attendant, the RF signal associating the valet attendant with a unique identifier.

22. The method of claim 18 further including the step of collecting a valet ticket identifier from the valet attendant.

23. The method of claim 19 further including the step of scanning electronic indicia printed on a valet ticket, the electronic indicia associating the valet ticket with a unique identifier.

24. The method of claim 18 further including the steps of:

collecting a first digital image of a front left region of the vehicle;

collecting a second digital image of a front right region of the vehicle;

collecting a third digital image of a rear right region of the vehicle; and collecting a fourth digital image of a rear left region of the vehicle.

25. The method of claim 18 further including the steps of:

verifying a validity of the valet parking data; and enabling entry of the vehicle into a parking area upon verification of the valet parking data.

26. The method of claim 25 further including the step of verifying a validity of a valet attendant identifier.

27. The method of claim 25 further including the step of verifying a validity of a valet ticket identifier.

28. The method of claim 18 further including the steps of generating a next vehicle retrieval request.

29. The method of claim 28 further including the step of receiving an acceptance of the request from the valet attendant.

30. The method of claim 28 further including the steps of receiving a denial of the request from the valet attendant.

31. A computerized valet parking system comprising:

a first kiosk for collecting a first set of valet parking data from a first valet attendant;

a first digital camera array for collecting pre-parking digital images of a vehicle at an entrance location of a parking area;

a network server for linking the pre-parking digital images to the first set of valet parking data;

wherein the first digital camera array includes:

a first pre-parking camera focused on a front left region of the vehicle for generating a first pre-parking digital image;

a second pre-parking camera focused on a front right region of the vehicle for generating a second pre-parking digital image;

a third pre-parking camera focused on a rear right region of the vehicle for generating a third pre-parking digital image; and a fourth pre-parking camera focused on a rear left region of the vehicle for generating a fourth pre-parking digital image.

32. The parking system of claim 31 further including:

a second kiosk for collecting a second set of valet parking data from a second valet attendant;

a second digital camera array for collecting post-parking digital images of the vehicle at an exit location of the parking area; and said network server further linking the post-parking images and the second set of valet parking data to the pre-parking images and the first set of valet parking data.

33. The parking system of claim 32 wherein the second digital camera array includes:

a first post-parking camera focused on a front left region of the vehicle for generating a first post-parking digital image;

a second post-parking camera focused on a front right region of the vehicle for generating a second post-parking digital image;

a third post-parking camera focused on a rear right region of the vehicle for generating a third post-parking digital image; and a fourth post-parking camera focused on a rear left region of the vehicle for generating a fourth post-parking digital image.

34. The parking system of claim 31 wherein the first kiosk generates next vehicle retrieval requests.

* * * * *